US010584038B2

(12) United States Patent
Maurer et al.

(10) Patent No.: US 10,584,038 B2
(45) Date of Patent: Mar. 10, 2020

(54) PROCESS FOR THE PRODUCTION OF PRECIPITATED CALCIUM CARBONATE

(71) Applicant: Omya International AG, Oftringen (CH)

(72) Inventors: Marc Maurer, Village-Neuf (FR); Mathieu Skrzypczak, Terrace Park, OH (US); Luis Pedroso, Coimbra (PT); Holger Spiegel, Villach (AT)

(73) Assignee: OMYA INTERNATIONAL AG, Oftringen (CH)

( * ) Notice: Subject to any disclaimer, the term of this patent is extended or adjusted under 35 U.S.C. 154(b) by 59 days.

(21) Appl. No.: 15/532,715

(22) PCT Filed: Dec. 8, 2015

(86) PCT No.: PCT/EP2015/079000
§ 371 (c)(1),
(2) Date: Jun. 2, 2017

(87) PCT Pub. No.: WO2016/091889
PCT Pub. Date: Jun. 16, 2016

(65) Prior Publication Data
US 2017/0355610 A1    Dec. 14, 2017

(30) Foreign Application Priority Data

Dec. 12, 2014  (EP) ..................... 14197536

(51) Int. Cl.
| C01F 11/00 | (2006.01) |
| C01F 11/18 | (2006.01) |
| D21H 17/67 | (2006.01) |
| D21H 19/38 | (2006.01) |
| D21H 11/12 | (2006.01) |

(52) U.S. Cl.
CPC ............ *C01F 11/183* (2013.01); *C01F 11/18* (2013.01); *C01F 11/182* (2013.01); *D21H 11/12* (2013.01); *D21H 17/675* (2013.01); *D21H 19/385* (2013.01); *C01P 2004/61* (2013.01); *C01P 2004/62* (2013.01); *C01P 2006/12* (2013.01); *C01P 2006/60* (2013.01)

(58) Field of Classification Search
CPC ............................................ C01F 11/181–183
USPC .................... 423/165, 432; 106/461
See application file for complete search history.

(56) References Cited

U.S. PATENT DOCUMENTS

| 2,964,382 A | * | 12/1960 | Hall, Jr. | ................ | C01F 11/181 |
| | | | | | 261/124 |
| 5,342,600 A | * | 8/1994 | Bleakley | ............... | C01F 11/181 |
| | | | | | 106/464 |
| 2002/0164280 A1 | * | 11/2002 | Kinnen | ................ | C01F 11/181 |
| | | | | | 423/432 |

| 2006/0067869 A1 | | 3/2006 | De Pauw Gerlings | | |
| 2007/0148078 A1 | * | 6/2007 | Skuse | ...................... | B01J 8/226 |
| | | | | | 423/432 |
| 2008/0053337 A1 | * | 3/2008 | Sohara | .................... | C09C 1/021 |
| | | | | | 106/464 |
| 2012/0189515 A1 | | 7/2012 | Jensen et al. | | |
| 2013/0336859 A1 | | 12/2013 | Tavakkoli et al. | | |
| 2015/0183652 A1 | | 7/2015 | Gärtner et al. | | |
| 2015/0183654 A1 | | 7/2015 | Tavakkoli et al. | | |

FOREIGN PATENT DOCUMENTS

| CN | 103 011 227 A | | 4/2013 |
| EP | 2 371 766 A1 | | 10/2011 |
| EP | 2 447 213 A1 | | 5/2012 |
| EP | 2 524 898 A1 | | 11/2012 |
| GB | 2 248 229 A | | 4/1992 |
| JP | 2000-203831 | * | 7/2000 |
| WO | 2005033403 A1 | | 4/2005 |
| WO | 2011154610 A1 | | 12/2011 |
| WO | 2012002324 A1 | | 1/2012 |
| WO | 2014041068 A1 | | 3/2014 |

OTHER PUBLICATIONS

Translation of Becker, "Highly reactive hydrated lime suspensions for industrial chemical processes—production and properties" Chem. Ing. Tech. 59, No. 3, 1987, pp. 228-235. (Year: 1987).*
International Search Report dated Feb. 24, 2016 for PCT/EP2015/079000.
Written Opinion of the International Searching Authority dated Feb. 24, 2016 for PCT/EP2015/079000.
Examination Report dated Oct. 6, 2017 from Australian Application No. 2015359488.
Notice of Acceptance for Patent Application dated Nov. 4, 2017 from Australian Application No. 2015359488.
Office Action dated Jul. 16, 2018 from Canadian Application No. 2,969,601.
Office Action dated Jan. 10, 2018 from Chinese Application No. 201580067498.6.
Search Report dated Jun. 3, 2015 from European Application No. 14197536.7.
Examination Report dated Mar. 15, 2018 from the Cooperation Council for the Arab States of the Gulf Application No. GC 2015-30554.
Office Action dated Apr. 17, 2018 from Japanese Application No. 2017-531227.
Office Action dated May 11, 2018 from Russian Application No. 2017124437.
Search Report dated May 11, 2018 from Russian Application No. 2017124437.
Written Opinion dated Dec. 19, 2017 from Singapore Application No. 11201704546W.
Examination Report dated Jun. 20, 2016 from Taiwanese Application No. 104141481.

(Continued)

*Primary Examiner* — Steven J Bos
(74) *Attorney, Agent, or Firm* — Fay Sharpe LLP

(57) ABSTRACT

The present invention relates to a process for the preparation of precipitated calcium carbonate allowing for a more sustainable and cost-efficient use of milk of lime. The obtainable products show good optical properties as well as fine particle size distributions.

30 Claims, 1 Drawing Sheet

(56) References Cited

OTHER PUBLICATIONS

International Preliminary Report on Patentability dated Jun. 22, 2017 from PCT Application No. PCT/EP2015/079000.
Notice of Opposition filed by Schaefer Kalk GmbH & Co. KG dated Jun. 27, 2018 from European Application No. 14197536.7.
H. Becker, "Hochreaktive Kalkhydrat-Suspensionen für industrielle chemische Prozesse—Herstellung und Eigenschaften," Chem.-Ing.-Tech., vol. 59, No. 3, 1987, pp. 228-235.
H. Falbe et al., "M-Pk," Römpp-Lexikon Chemie Stuttgart, New York, 10th Edition, vol. 4, 1998, pp. 2770-2771.
H. Falbe et al., "T-Z," Römpp-Lexikon Chemie Stuttgart, New York, 10th Edition, vol. 6, 1999, p. 5118.
H. Falbe et al., "H-L," Römpp-Lexikon Chemie Stuttgart, New York, 10th Edition, vol. 3, 1997, p. 1857.
FLSmidth, "Slaking and Causticizing," 2011, pp. 2 and 3.

\* cited by examiner

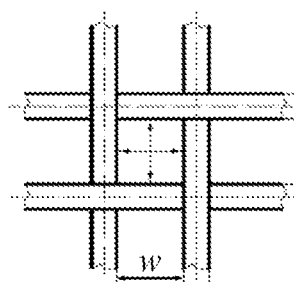
aperture size (symbol: "$w$")

PROCESS FOR THE PRODUCTION OF PRECIPITATED CALCIUM CARBONATE

CROSS-REFERENCE TO RELATED APPLICATIONS

This is a U.S. national phase of PCT Application No. PCT/EP2015/079000, filed Dec. 8, 2015, which claims priority to European Application No. 14197536.7, filed Dec. 12, 2014.

The present application relates to a process for the production of precipitated calcium carbonate.

Calcium carbonate in general is used extensively in the paper industry as a filler component or coating pigment in paper. It is a low cost, high brightness filler used to increase sheet brightness and opacity. Its use has increased dramatically in the last decades due to the conversion from acid to alkaline papermaking at paper mills. Both ground natural calcium carbonates (GCC) and synthetic calcium carbonates are used in the paper industry. Typically, natural calcium carbonate sources (e.g., limestone) are ground down to small particle sizes prior to their use in paper while synthetic calcium carbonate is manufactured by a precipitation reaction and, thus, is called precipitated calcium carbonate (PCC).

Besides its use in the papermaking industry, precipitated calcium carbonate is also used for various other purposes, e.g., as a filler or pigment in the paint industries, and as functional filler for the manufacture of plastic materials, plastisols, sealing compounds, printing inks, rubbers, toothpaste, cosmetics, etc.

Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as diverse assortment of thin elongated prismatic, curved bladed, steep pyramidal, chisel shaped crystals, branching tree, and coral or worm-like form.

Among these forms, the scalenohedral form of calcite is particularly desirable for use as a bulking pigment in the paper industry because it is relatively inexpensive to produce and it has desirable light scattering properties.

Usually, precipitated calcium carbonate is prepared by introducing carbon dioxide into an aqueous suspension of calcium hydroxide, the so-called "milk of lime", in a carbonation step:

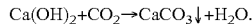

Typically, precipitated calcium carbonate obtained by carbonation of milk of lime shows superior opacifying properties and brightening effects when used as filler or coating pigment in paper applications as compared to ground natural calcium carbonate.

In the prior art, it is also known to prepare precipitated calcium carbonate by introducing an aqueous suspension of calcium hydroxide into carbonated water by so-called "inverse" carbonation. Alternatively, precipitated calcium carbonate can also be the product of contacting calcium with carbonate salts (e.g., calcium chloride and sodium carbonate) in an aqueous environment. Precipitated calcium carbonates are described, for example, in EP 2 447 213, EP 2 524 898, and EP 2 371 766.

As already described above, the most common method for the production of precipitated calcium carbonate involves the carbonation of milk of lime which is obtainable by contacting calcium oxide (also referred to as burnt lime or quicklime) with water in a so-called slaking process:

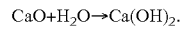

Calcium hydroxide is poorly soluble in water and shows a solubility ranging from 1.2 to 1.7 g/l of water. Therefore, the product resulting from the above slaking process is obtained in the form of a suspension.

In practice, such calcium hydroxide suspensions have a maximum solids content of up to approximately 40 wt.-%, based on the total weight of said suspension. However, in EP 2 371 766 it is described that it may already become difficult to prepare and handle milk of lime having a solids content exceeding 30 wt.-% without adding viscosity reducing substances.

Another major problem in the preparation and carbonation of milk of lime relates to the presence of grit which is a particulate material showing no or only low reactivity in carbonation processes.

The low reactivity of grit towards carbon dioxide may be explained by its chemical composition. Typically, grit is composed of from 50 to 90 wt.-% and mostly from 70 to 90 wt.-% calcium carbonate and other inorganic minerals. Further components present in a grit fraction may thus be other insoluble or lowly soluble carbonates (e.g., magnesium carbonate) and also very often sand. Moreover, grit may also contain minor amounts of calcium hydroxide, for example in the form of calcium hydroxide particles being at least partially covered with calcium carbonate.

The presence of grit in milk of lime in a carbonation step has several disadvantages and may, for example, lead to a drop in brightness of precipitated calcium carbonate which may be explained by the presence of sand and other non-white minerals in said grit. Furthermore, the presence of grit may also lead to an undesired particle size distribution of precipitated calcium carbonate, for example to a significantly increased particle size topcut ($d_{98}$).

In order to overcome these drawbacks, it is quite common to remove grit from the milk of lime in a separation step prior to carbonation, for example in an upstream screening process. Still today, the grit fractions separated from milk of lime are considered as waste material, in particular due to its low brightness (R457) which in most cases is below 90% or even below 80%.

For example, WO 2005/033403 discloses a composition comprising an alkaline earth metal carbonate and a substrate, where the composition has a reduced amount of grit, such as an amount of less than or equal to about 0.5 wt.-% relative to the total weight of the composition. The composition can be a filler composition for use in, for example, paper making applications. Where the alkaline earth metal is a calcium carbonate, the grit can be reduced by degritting slaked lime slurry prior to precipitation of the alkaline earth metal with the substrate. The degritting can be performed by hydrocycloning the lime slurry.

WO 2011/154610 discloses a method and apparatus for in-line production of milk of lime into an in-line production process of PCC arranged in connection with a fibrous web machine. According to said process, the lime is slaked in a slaking apparatus at a temperature of at least 80° C., preferably at least 85° C., more preferably at least 100° C., the produced milk of lime is then cleaned by separating excessively large calcium hydroxide particles from it immediately and prior to introducing the milk of lime into the production process of PCC.

However, the removal of undesired grit may lead to an increase in material and production costs as, on the one hand, the removed grit material is included in the purchase price of calcium oxide or milk of lime and, on the other hand, also significant disposal costs may result.

Therefore, there is still a need to improve the processes for the preparation of precipitated calcium carbonate in order to reduce or avoid one or more of the aforementioned technical drawbacks.

In this respect, one object of the present invention may be seen in the provision of a process for the preparation of precipitated calcium carbonate allowing for a more sustainable and cost-efficient use of milk of lime.

The foregoing and other problems may be solved by the subject-matter as defined herein in the independent claims.

A first aspect of the present invention relates to a process for the preparation of precipitated calcium carbonate, the process comprising the steps of:
(a) providing milk of lime;
(b) separating, in one or more steps, grit from the milk of lime provided in step (a), said grit corresponding to an oversize fraction retained by a screen having an aperture size of 400 μm or finer, to obtain:
  (i) grit reduced milk of lime, and
  (ii) one or more grit fractions;
(c) milling one or more of the grit fractions of step (b) in at least one milling unit to obtain fine grit; and
(d) subjecting to a carbonation step either:
  (i) the fine grit of step (c), or
  (ii) a mixture comprising the grit reduced milk of lime of step (b) and the fine grit of step (c);
wherein said carbonation step comprises the introduction of carbon dioxide to obtain precipitated calcium carbonate.

The process according to the present invention is a process for the preparation of precipitated calcium carbonate from milk of lime comprising a carbonation step. In said carbonation step, referred to as step (d), either (i) fine grit or (ii) a mixture of both fine grit and grit reduced milk of lime is contacted with carbon dioxide to form a precipitate of solid calcium carbonate. A common feature of both options (i) and (ii) of carbonation step (d) is the carbonation of fine grit which is obtained from separating grit from the milk of lime provided in process step (a) and milling said grit prior to carbonation.

Another aspect of the present invention relates to a mineral filler product. Said product is obtainable by the process according to the present invention.

Still another aspect of the present invention relates to the use of the precipitated calcium carbonate according to the present invention in polymer compositions, paper making, paper products, paper coatings, agricultural applications, paints, adhesives, sealants, construction applications, food applications, pharmaceutical applications or cosmetic applications, preferably in paper making, paper products or paper coatings.

The term "grit" or "grit fraction" as used herein may be defined as the oversize fraction retained by a screen having a specified aperture size, for example 400 μm. Depending on the aperture size used for screening, the grit fraction may represent from 3 to 8 wt.-% of the total solids present in milk of lime. For example, grit can be found in calcined lime or milk of lime and may include, among other things, quartz and unburnt calcium carbonate. These compounds, when present in milk of lime, may show no or only low reactivity towards carbon dioxide and, therefore, should be removed prior to carbonation of said milk of lime.

The term "aperture size" (symbol: "w") as used in the present application and shown in FIG. 1 refers to the aperture size of a wire screen as defined according to ISO 3310-1:2000(E).

Where the particle size of a grit fraction is described by its "particle size distribution", the value $d_x$ represents the diameter relative to which x % by volume of the particles have diameters of less than $d_x$. This means, for example, that the $d_{98}$ value (also referred to as the "topcut") is the particle size at which 98 vol.-% of all particles of a grit fraction are smaller than the indicated value. In this case, the $d_{50}$ value is the "volume median particle size" at which 50 vol.-% of all particles are smaller than the indicated particle size. Grit particle sizes defined within the present application being smaller than 45 μm can be determined using a Malvern Mastersizer 2000 Laser Diffraction System with a defined RI of 1.57 and iRI of 0.005 and Malvern Application Software 5.60. The measurement was performed with an aqueous dispersion. The samples were dispersed using a high-speed stirrer. In case of grit particle sizes being 45 μm or larger, fractional sieving according to the ISO 3310-1:2000(E) standard is used to determine particle size distributions.

For all other particles, especially those of the precipitated calcium carbonate obtainable according to the inventive process, the value $d_x$ represents the diameter relative to which x % by weight of the particles have diameters of less than $d_x$. This means, for example, that the $d_{98}$ value (also referred to as the "topcut") is the particle size at which 98 wt.-% of all particles of a fraction are smaller than the indicated value. In this case, the $d_{50}$ value is the "weight median particle size" at which 50 wt.-% of all particles are smaller than the indicated particle size. Particle sizes being smaller than 45 μm can be determined based on measurements made by using a Sedigraph™ 5100 instrument of Micromeritics Instrument Corporation. The method and the instrument are known to the skilled person and are commonly used to determine the particle size of fillers and pigments. The measurements are carried out in an aqueous solution of 0.1 wt.-% $Na_4P_2O_7$. Samples are dispersed using a high speed stirrer and supersonics. In case of particle sizes being 45 μm or larger, fractional sieving according to the ISO 3310-1:2000 standard is used to determine particle size distributions.

If necessary, the "solids content" of a suspension in the meaning of the present invention can be determined using a Moisture Analyzer HR73 from Mettler-Toledo (T=120° C., automatic switch off 3, standard drying) with a sample size of 5 to 20 g.

Any specified "conversion of calcium hydroxide into precipitated calcium carbonate" given as % and relating to a certain time of grit addition in a carbonation step is based on an assumed constant reaction rate until precipitation of calcium carbonate is complete. Based on this constant reaction rate, the conversion percentages defined herein are calculated on a linear time scale from the total reaction time (100% conversion) of a comparison experiment. The total reaction time in said comparison experiment is the time at which, under identical conditions but without the addition of grit, a conductivity minimum with a conductivity curve inflection point slope of more than 45° can be observed. For example, if the fine grit is to be added to the grit reduced milk of lime at a time corresponding to 50% conversion of calcium hydroxide, this means that said fine grit is added at 50% of the total reaction time determined in a comparison experiment without addition of fine grit (e.g., at 15 min from the beginning of the carbonation if the total reaction time observed in the comparison experiment is 30 min). The conductivity of the suspension is measured directly in the reaction vessel during the reaction using a Mettler Toledo Seven Multi equipped with the corresponding Mettler Toledo conductivity expansion unit and a Mettler Toledo InLab® 730 conductivity probe. The instrument was first calibrated in the relevant conductivity range using commercially available conductivity calibration solutions from Mettler Toledo. The influence of temperature on conductivity is automatically corrected by the linear correction mode.

The "brightness (R457)" values (in %) as given in this application can be measured according to ISO 2469:2007 (R457 using an Elrepho spectrophotometer). For this purpose, all samples are dried over night at 105° C. before measurement to obtain a total moisture content of less than 0.5 wt.-%, based on the total sample weight.

Throughout the present document, the "specific surface area" (expressed in $m^2/g$) of a mineral filler is determined using the BET method (using nitrogen as adsorbing gas), which is well known to the skilled person (ISO 9277:1995). The total surface area (in $m^2$) of the mineral filler can be obtained by multiplication of the specific surface area (in $m^2/g$) and the mass (in g) of the mineral filler.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Advantageous embodiments of the process according to the present invention and embodiments of the precipitated calcium carbonate obtainable by the process according to the present invention are defined in the corresponding subclaims.

In one embodiment of the process according to the present invention, the milk of lime provided in step (a) has a solids content of from 1.0 to 40.0 wt.-%, preferably from 5.0 to 35.0 wt.-%, and more preferably from 10.0 to 32.0 wt.-%, based on the total weight of said milk of lime.

According to another embodiment, step (b) comprises a screening step by use of one or more screens having an aperture size of 400 µm or finer, preferably from 400 to 150 µm, more preferably from 350 to 180 µm, and most preferably from 250 to 200 µm.

According to still another embodiment, the at least one milling unit of step (c) comprises a sand mill, a roller mill, a ball mill, or a hammer mill, preferably the at least one milling unit of step (c) comprises a sand mill.

According to still another embodiment, the solids content of the grit fractions during milling is in the range of from 20.0 to 80.0 wt.-%, preferably from 25.0 to 50.0 wt.-%, and more preferably from 30.0 to 45.0 wt.-%, based on the total weight said grit fractions.

In another embodiment, step (c) further comprises a step of screening one or more of the grit fractions, subsequently to the milling of said fractions, by use of one or more screens and removing one or more oversize fractions retained by said one or more screens.

In another embodiment, said one or more screens have an aperture size of 300 µm or finer, preferably from 300 to 45 µm, more preferably from 250 to 50 µm, and most preferably from 200 to 80 µm.

According to still another embodiment, the fine grit of step (c) has a $d_{50}$ ranging from 0.1 to 10.0 µm, preferably from 0.2 to 5.0 µm, and more preferably from 0.3 to 3.0 µm.

According to still another embodiment, the fine grit of step (c) has a $d_{98}$ ranging from 2.0 to 20.0 µm, preferably from 5.0 to 15.0 µm, and more preferably from 6.0 to 12.0 µm.

In another embodiment of the process according to the present invention, the starting temperature in step (d) ranges from 5 to 80° C. and preferably from 10 to 75° C.

According to still another embodiment, said process further comprises a step of adding at least one additive selected from monosaccharides, disaccharides, polyacrylic acids in their neutralized or partly neutralized forms, citric acid, or sodium citrate to the milk of lime provided in step (a) and/or the grit reduced milk of lime of step (b) and/or one or more of the grit fractions of step (b) and/or the fine grit of step (c) in a total amount of from 0.005 to 1.0 wt.-%, preferably from 0.01 to 0.5 wt.-%, and more preferably from 0.02 to 0.2 wt.-%, based on the total dry weights.

In one embodiment of the process according to the present invention, step (d) consists of subjecting to a carbonation step the fine grit of step (c).

In another embodiment, step (d) consists of subjecting to a carbonation step the mixture comprising the grit reduced milk of lime of step (b) and the fine grit of step (c), wherein the fine grit is added to the grit reduced milk of lime in one or more portions.

According to a preferred embodiment, the total amount of fine grit added to the grit reduced milk of lime ranges from 0.1 to 15.0 wt.-%, preferably from 0.2 to 10.0 wt.-%, and more preferably from 0.5 to 5.0 wt.-%, based on the total dry weights.

According to another preferred embodiment the fine grit is added to the grit reduced milk of lime at a time corresponding to from 0 to 100%, preferably from 35 to 95%, more preferably from 50 to 90%, and most preferably from 60 to 80% conversion of calcium hydroxide into precipitated calcium carbonate.

In still another embodiment, the precipitated calcium carbonate obtainable by the process according to the present invention has a brightness (R457) of at least 80.0%, preferably at least 90.0%, more preferably at least 92.0%, even more preferably at least 93.0%, and most preferably at least 93.5%.

In the art, it is quite common to remove (e.g., by screening or other separation methods) grit contained in milk of lime prior to carbonation in order to improve the particle size distribution of precipitated calcium carbonate and to improve optical properties such as, for example, the brightness.

In general, grit itself is a particulate material and is characterized by a relatively coarse particle size distribution and low brightness (R457) which may be as low as, for example, 90% or even 80%. Therefore, grit represents a material of low value which, however, must be paid with the purchase price of calcium oxide or milk of lime and, thus, may lead to a significant increase of overall production costs.

Although it is still necessary to separate grit from milk of lime prior to carbonation, the inventors surprisingly found that it possible to also use separated grit in a carbonation process in form of fine grit obtainable after milling the separated grit. It was further found that said fine grit may be carbonated either alone or in a mixture comprising fine grit and grit reduced milk of lime.

Upon carbonation of pure fine grit, the brightness (R457) was surprisingly found to increase significantly as compared to the fine grit (i.e. separated milled grit) prior to carbonation. In many cases, the brightness (R457) may be increased by 1 to 5%. Typically, the brightness (R457) of pure fine grit may be increased by 2 to 4% upon carbonation, for example by 3.3%. Without being bound to any theory, it is believed that the increase in brightness upon carbonation may result from the carbonation of unreacted calcium hydroxide released during milling of the separated grit.

In view of the foregoing observation, it is also possible to carbonate a mixture comprising fine grit and grit reduced milk of lime in a combined carbonation. For many applications, a high brightness of precipitated calcium carbonate is of particular importance, e.g., in the field of paper fillings or coatings. It was surprisingly observed that the brightness of precipitated calcium carbonate is only slightly reduced when adding fine grit in carbonation step (d) and, thus, high brightness values (R457) of at least 90.0% may be achieved after combined carbonation while it is possible to add considerable amounts of fine grit instead of subjecting same to disposal.

Likewise, it was found that the addition of fine grit during the combined carbonation of fine grit and grit reduced milk of lime may result in a finer particle size distribution (observed as $d_{50}$ and $d_{98}$) which may also have several advantages in cases where the precipitated calcium carbonate is used, for example, in polymer or paper applications.

In summary, the process according to the present invention represents a sustainable and cost-efficient process for the preparation of precipitated calcium carbonate allowing for the recycling of grit in a carbonation step.

In the following, preferred embodiments of the process according to the present invention will be discussed in more detail. It is to be understood that these details and embodiments also apply to the precipitated calcium carbonate obtainable by the inventive process as well as to the use of said product in any of the specified applications.

Step (a)-Providing Milk of Lime

In step (a) of the process according to the present invention, a milk of lime is provided. Said milk of lime may be commercially available or, alternatively, obtained by contacting a calcium oxide source (e.g., burnt lime or quicklime) with water.

The reaction of the calcium oxide with water results in the formation of a milky calcium hydroxide suspension, better known as milk of lime. Said reaction is highly exothermic and, in the art, is also referred to as "lime slaking" or simply "slaking".

The progress of the slaking reaction may be observed by measuring the conductivity of the reaction mixture which, initially, quickly decreases and reaches an essentially constant level as soon as the reaction is completed. Likewise, it may be monitored by temperature and turbidity control.

Typically, the weight ratio of calcium oxide to water is less than 1:6, usually 1:9 or 1:10. However, it also possible to use and handle milk of lime prepared from water and calcium oxide in a weight ratio of from 1:2.5 to 1:6 if viscosity reducing additives are used during preparation of suspensions having relatively high solids contents.

The milk of lime used in the process according to the present invention can be characterized by its solids content. In one embodiment, the milk of lime provided in step (a) has a solids content of from 1.0 to 40.0 wt.-%, preferably from 5.0 to 35.0 wt.-%, and more preferably from 10.0 to 32.0 wt.-%, based on the total weight of said milk of lime.

As already described above, in many cases, and in particular in cases where the solids content is higher than 15 wt.-%, it may be advantageous to reduce the viscosity of milk of lime by adding a suitable additive.

In one embodiment of the present invention, the process further comprises a step of adding at least one additive selected from monosaccharides, disaccharides, polyacrylic acids in their neutralized or partly neutralized forms, citric acid, or sodium citrate to the milk of lime provided in step (a) in a total amount of from 0.005 to 1.0 wt.-%, preferably from 0.01 to 0.5 wt.-%, and more preferably from 0.02 to 0.2 wt.-%, based on the total dry weights.

Therefore, in another embodiment of the process according to the present invention, the milk of lime provided in step (a) comprises at least one additive selected from monosaccharides, disaccharides, polyacrylic acids in their neutralized or partly neutralized forms, citric acid, or sodium citrate in a total amount of from 0.005 to 1.0 wt.-%, preferably from 0.01 to 0.5 wt.-%, and more preferably from 0.02 to 0.2 wt.-%, based on the total dry weights.

In the meaning of the present application, polyacrylic acids in their neutralized or partly neutralized forms are understood to be neutralized or partly neutralized with lithium, potassium, sodium, magnesium, calcium, strontium, or mixtures thereof.

In a preferred embodiment, said at least one additive is selected from sucrose, citric acid, or sodium citrate and more preferably is sucrose.

According to another embodiment of the present invention, the milk of lime provided in process step (a) has a specific Brookfield viscosity at 20° C. of from 1 to 1,000 mPa·s, preferably from 5 to 800 mPa·s, and more preferably from 10 to 500 mPa·s.

For the purpose of the present invention, the term "viscosity" or "Brookfield viscosity" refers to a viscosity measured by a Brookfield (Type RVT) viscometer at 25° C. ±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1,600 mPa·s the spindle number 4 may be used, and for a viscosity range between 800 and 3,200 mPa·s the spindle number 5 may be used.

Step (b)-Separation of Grit

According to step (b) of the inventive process, grit is separated in one or more steps from the milk of lime provided in step (a) to obtain grit reduced milk of lime and one or more grit fractions.

As already defined herein above, the term "grit" or "grit fraction" may be defined as the oversize fraction retained by a screen having a specified aperture size, for example 400 µm.

In order to improve optical properties and to obtain a finer particle size distribution, it has become common practice to separate one or more grit fractions prior to carbonating the milk of lime. Typically, grit or a grit fraction may be defined as the oversize fraction retained by a screen having a specified aperture size, for example 400 µm. Depending on the aperture size used for screening, the grit fraction may represent from 3 to 8 wt.-% of the total solids present in milk of lime. In this respect, "grit reduced milk of lime" in the meaning of the present invention is a milk of lime which has been subjected to one or more steps of grit separation.

In general, one or more grit fractions may be separated from the milk of lime by any separation method known in the art. For this purpose, screening devices as well as gravity-based devices, such as centrifuges, cyclones, sedimentation devices, and any combination (e.g., series or cascades) of the aforementioned devices and methods may be used.

In some embodiments of the present invention, step (b) comprises a screening step, wherein said screening step may be carried by use of one or more screens.

In general, grit may be characterized by its low reactivity towards carbon dioxide and mainly consists of relatively large particles. The one or more grit fraction may thus be removed by using one or more screens having aperture sizes of up to 400 µm.

In one embodiment of the inventive process, step (b) comprises a screening step by use of one or more screens having an aperture size of 400 µm or finer, preferably from 400 to 150 µm, more preferably from 350 to 180 µm, and most preferably from 250 to 200 µm.

According to still another embodiment, step (b) comprises a screening step by use of a first screen and a second screen, wherein said first screen has an aperture size of from 400 to 200 µm and said second screen has an aperture size of from 150 µm to 100 µm, to obtain:
(i) grit reduced milk of lime, and
(ii) a first and a second grit fraction.

The one or more grit fractions obtained in separating step (b) result from a separation of grit from milk of lime which is aqueous suspension. The skilled person will thus appreciate that said one or more grit fraction may comprise considerable amounts of water and may also be regarded as aqueous suspensions.

Therefore, in some embodiments, the one or more grit fractions may have a solids content in the range of from 20.0 to 80.0 wt.-%, preferably from 25.0 to 50.0 wt.-%, and more preferably from 30.0 to 45.0 wt.-%, based on the total weight said grit fractions.

In another embodiment, the process according to the present invention may comprise a step of adding at least one additive selected from monosaccharides, disaccharides, polyacrylic acids in their neutralized or partly neutralized forms, citric acid, or sodium citrate to the grit reduced milk of lime of step (b) and/or one or more of the grit fractions of step (b) in a total amount of from 0.005 to 1.0 wt.-%, preferably from 0.01 to 0.5 wt.-%, and more preferably from 0.02 to 0.2 wt.-%, based on the total dry weights.

Preferably, said at least one additive is selected from sucrose, citric acid, or sodium citrate and more preferably is sucrose.

Step (c)-Grit Milling

According to step (c) of the process of the present invention, one or more of the grit fractions obtained in step (b) are subjected to a milling step to obtain so-called fine grit.

Said milling step serves to reduce the particle size of the grit fraction. For this purpose any suitable mill known to the skilled person may be used, for example a sand mill, a roller mill, a ball mill, or a hammer mill.

In general, one grit fraction or, alternatively, more grit fractions can be subjected to milling step (c) depending on whether one or more separating steps are used in process step (b). In cases where more than one (e.g., two or three) grit fractions are obtained in step (b), it is generally possible to subject only part or all of said fractions to milling step (c). For example, step (b) may comprise a screening step by use of a first screen and a second screen to obtain (i) grit reduced milk of lime, and (ii) a first and a second grit fraction. In the latter case it is possible to mill the first, the second or also both grit fractions.

In a preferred embodiment of the present invention, the process for the preparation of precipitated calcium carbonate comprises the steps of:
(a) providing milk of lime;
(b) separating, by use of a first screen having an aperture size of from 400 to 200 µm and a second screen having an aperture size of from 150 µm to 100 µm, grit from the milk of lime provided in step (a), said grit corresponding to an oversize fraction retained by a screen having an aperture size of 400 µm or finer, to obtain:
 (i) grit reduced milk of lime, and
 (ii) a first and a second grit fraction;
(c) milling the first grit fractions of step (b) in at least one milling unit to obtain fine grit; and
(d) subjecting to a carbonation step either:
 (i) the fine grit of step (c), or
 (ii) a mixture comprising the grit reduced milk of lime of step (b) and the fine grit of step (c);
wherein said carbonation step comprises the introduction of carbon dioxide to obtain precipitated calcium carbonate.

As described herein above, the one or more grit fractions obtained in separating step (b) may contain considerable amounts of water and, thus, milling step (c) can be considered as a wet milling or wet grinding step. In this respect and with regard to the particle size distribution of the one or more grit fractions, the at least one milling unit of step (c) preferably comprises a sand mill.

Depending on the solids content of the one or more grit fractions obtained in separating step (b), the solids content of said fractions during milling may be in the range of from 20.0 to 80.0 wt.-%, preferably from 25.0 to 50.0 wt.-%, and more preferably from 30.0 to 45.0 wt.-%, based on the total weight said grit fractions.

In general, it is also possible to adjust the solids content of the one or more grit fractions prior to milling step (c) to the specific needs of the process, for example to any of the values specified herein above or any other suitable value, for example by addition or partial removal of water.

In order to improve the particle size distribution of the fine grit obtained in process step (c), said step may further comprise a step of screening one or more of the grit fractions, subsequently to the milling of said fractions, by use of one or more screens and removing one or more oversize fractions retained by said one or more screens.

In one embodiment, said one or more screens have an aperture size of 300 µm or finer, preferably from 300 to 45 µm, more preferably from 250 to 50 µm, and most preferably from 200 to 80 µm.

The foregoing screening step may be used to further reduce the particle sizes of the grit fractions after milling, for example to reduce the $d_{50}$ or the $d_{98}$.

Independently from whether milling step (c) comprises a further screening step or not, the fine grit obtained after step (c) may be characterized by a specific particle size distribution.

In one embodiment, the fine grit of step (c) has a $d_{50}$ ranging from 0.1 to 10.0 µm, preferably from 0.2 to 5.0 µm, and more preferably from 0.3 to 3.0 µm.

Additionally or alternatively to the $d_{50}$, the fine grit of step (c) may have a $d_{98}$ ranging from 2.0 to 20.0 µm, preferably from 5.0 to 15.0 µm, and more preferably from 6.0 to 12.0 µm.

Step (d)-Carbonation

In step (d) of the process according to the present invention, either the fine grit of step (c), or a mixture comprising the grit reduced milk of lime of step (b) and the fine grit of step (c) are subjected to a carbonation step.

Independently from whether only the fine grit or a mixture comprising fine grit and grit reduced milk of lime is carbonated in step (d), the solids content during said step may range from 1.0 to 40.0 wt.-%, preferably from 5.0 to 35.0 wt.-%, and more preferably from 10.0 to 32.0 wt.-%, based on the total weight of said milk of lime.

In general, it is possible to also adjust the solids content of the fine grit of step (c), or the mixture comprising the grit reduced milk of lime of step (b) and the fine grit of step (c) to the specific needs of the process, for example to any of the values specified herein above or any other suitable value, for example by addition or partial removal of water.

In said carbonation step, either the fine grit of step (c), or a mixture comprising the grit reduced milk of lime of step (b) and the fine grit of step (c) are contacted with carbon dioxide which may be introduced into the process, e.g., by injection of gaseous carbon dioxide, depending on its physical condition. As already described herein above, the precipitated calcium carbonate formed in said carbonation step results from the conversion of calcium hydroxide which may be present in the fine grit of step (c) and, in particular, in the grit reduced milk of lime of step (b).

In general, it is possible to use carbon dioxide in any physical condition. However, in practice it will be preferred to use solid carbon dioxide (so-called dry ice), gaseous carbon dioxide, or mixtures thereof.

In a preferred embodiment of the process according to the present invention, step (d) comprises the injection of gaseous carbon dioxide.

In cases where gaseous carbon dioxide is injected, it is possible to inject either undiluted gaseous carbon dioxide (100 vol.-% carbon dioxide, based on the total volume of injected gas) or diluted gaseous carbon dioxide (e.g., 1.0 to 99.0 vol.-% carbon dioxide, based on the total volume of injected gas). In the latter case, gaseous carbon dioxide may be diluted with air or nitrogen gas, wherein air is preferred. In some embodiments, flue gas may be injected as a source for diluted gaseous carbon dioxide.

According to one embodiment of the process according to the present invention, step (d) comprises the injection of undiluted gaseous carbon dioxide.

According to another embodiment, step (d) comprises the injection of diluted gaseous carbon dioxide having a concentration of from 2.0 to 75.0 vol.-%, preferably from 5.0 to 50.0 vol.-%, and more preferably from 10.0 to 35.0 vol.-%, based on the total volume of injected gas, wherein said gaseous carbon dioxide is preferably diluted with air.

It was found that optimal carbonation results in terms of brightness and particle size distribution can be obtained in cases where the temperature of the material subjected to carbonation is adjusted prior to introduction of carbon dioxide, e.g., prior to the injection of gaseous carbon dioxide.

In the meaning of the present application, the temperature which is adjusted prior to introduction of carbon dioxide in carbonation step (d) is referred to as the "starting temperature".

In some embodiments of the process according to the present invention, the starting temperature in step (d) ranges from 5 to 80° C. and preferably from 10 to 75° C.

In another embodiment, the starting temperature in step (d) ranges from 20 to 80° C., preferably from 30 to 70° C., and more preferably from 40 to 60° C.

As regards the options (i) and (ii) described in process step (d), in one embodiment process step (d) may consist of subjecting to a carbonation step only the fine grit of step (c) (option (i)).

However, it is also possible to carbonate only a mixture comprising the grit reduced milk of lime of step (b) and the fine grit of step (c) (option (ii)).

Therefore, in another embodiment, step (d) consists of subjecting to a carbonation step the mixture comprising the grit reduced milk of lime of step (b) and the fine grit of step (c), wherein the fine grit is added to the grit reduced milk of lime in one or more portions.

In general, it is possible to add the fine grit at any time of carbonation step (d). For example, it is even possible to add the fine grit to the grit reduced milk of lime at a time corresponding to 0 or 100% conversion of calcium hydroxide into precipitated calcium carbonate. If fine grit is added at a time corresponding to 0% conversion of calcium hydroxide, this may be seen as an addition before starting the carbonation by introducing carbon dioxide. If fine grit is added at a time corresponding to 100% conversion of calcium hydroxide, this may be seen as an addition of fine grit subsequently to the complete conversion of calcium hydroxide of the grit reduced milk of lime.

In case of combined carbonation, the inventors found that, in order to achieve optimal results in terms of brightness and particle size distribution, it may be beneficial to start carbonation step (d) in the absence of fine grit by introducing carbon dioxide (e.g., by injecting gaseous carbon dioxide) into the grit reduced milk of lime followed by the addition of fine grit in one or more portions.

Therefore, according to another embodiment, the fine grit is added to the grit reduced milk of lime at a time corresponding to from 35 to 95%, preferably from 50 to 90%, and more preferably from 60 to 80% conversion of calcium hydroxide into precipitated calcium carbonate.

In some embodiments of the process according to the present invention, the fine grit is added to the grit reduced milk of lime at a time corresponding to from 0 to 100%, preferably from 35 to 95%, more preferably from 50 to 90%, and most preferably from 60 to 80% conversion of calcium hydroxide into precipitated calcium carbonate, wherein step (d) comprises the injection of diluted gaseous carbon dioxide having a concentration of from 2.0 to 75.0 vol.-%, preferably from 5.0 to 50.0 vol.-%, and more preferably from 10.0 to 35.0 vol.-%, based on the total volume of injected gas, and wherein said gaseous carbon dioxide is preferably diluted with air.

Additionally or alternatively, it may also be beneficial to add only certain amounts of fine grit to the grit reduced milk of lime in order to obtain precipitated calcium carbonate having the desired optical properties as, for example a high brightness (R457).

Therefore, according to one embodiment, the total amount of fine grit added to the grit reduced milk of lime may range from 0.1 to 15.0 wt.-%, preferably from 0.2 to 10.0 wt.-%, and more preferably from 0.5 to 5.0 wt.-%, based on the total dry weights.

The process according to the present invention may further comprise a step of adding at least one additive selected from monosaccharides, disaccharides, polyacrylic acids in their neutralized or partly neutralized forms, citric acid, or sodium citrate to the milk of lime provided in step (a) and/or the grit reduced milk of lime of step (b) and/or one or more of the grit fractions of step (b) and/or the fine grit of step (c) in a total amount of from 0.005 to 1.0 wt.-%, preferably from 0.01 to 0.5 wt.-%, and more preferably from 0.02 to 0.2 wt.-%, based on the total dry weights.

Therefore, in another embodiment of the process according to the present invention, the fine grit of step (c) and also the mixture comprising the grit reduced milk of lime of step (b) and the fine grit of step (c) subjected to carbonation step (d) may comprise at least one additive selected from monosaccharides, disaccharides, polyacrylic acids in their neutralized or partly neutralized forms, citric acid, or sodium citrate in a total amount of from 0.005 to 1.0 wt.-%, preferably from 0.01 to 0.5 wt.-%, and more preferably from 0.02 to 0.2 wt.-%, based on the total dry weights.

Preferably, said at least one additive is selected from sucrose, citric acid, or sodium citrate and more preferably is sucrose.

The precipitated Calcium Carbonate

The product obtainable by the process according to the present invention is a precipitated calcium carbonate.

In order to further improve the particle size distribution or other parameters of the precipitated calcium carbonate, such as the brightness (R457) or the specific surface area, an optional classifying step (e.g., a screening step) may be carried out after carbonation step (d).

In one embodiment of the process according to the present invention, the process thus comprises a further step of screening the precipitated calcium carbonate obtained in carbonation step (d) by use of one or more screens, preferably said one or more screens have an aperture size of 300 µm or finer, preferably from 300 to 45 µm, more preferably from 250 to 50 µm, and most preferably from 200 to 80 µm.

Preferably, the process according to the present invention comprises a further step of classifying the precipitated calcium carbonate obtained in carbonation step (d) by use of a cyclone or air classifier.

The precipitated calcium carbonate obtainable by the process according to the present invention may be characterized by a specific particle size distribution.

In one embodiment, the precipitated calcium carbonate has a $d_{50}$ ranging from 0.1 to 10.0 µm, preferably from 0.2 to 5.0 µm, and more preferably from 0.3 to 3.0 µm.

Additionally or alternatively to the $d_{50}$, the precipitated calcium carbonate may have a $d_{98}$ ranging from 2.0 to 20.0 µm, preferably from 5.0 to 15.0 µm, and more preferably from 6.0 to 12.0 µm.

The inventors found that the precipitated calcium carbonate prepared according to the inventive process exhibits good to excellent optical properties (e.g., high brightness) although considerable amounts of grit are used in carbonation step (d).

According to one embodiment, the product obtainable according to the present invention has a brightness (R457) of at least 80.0%, preferably at least 90.0%, more preferably at least 92.0%, even more preferably at least 93.0%, and most preferably at least 93.5%.

In some cases, for example in case of carbonating a mixture comprising fine grit and grit reduced milk of lime (option (ii) of step (d)), the product obtainable according to the present invention may have a brightness (R457) of at least 90.0%, preferably at least 92.0%, more preferably at least 93.0%, and most preferably at least 93.5%.

As the process according to the present invention may comprise a step of adding at least one additive to the milk of lime provided in step (a) and/or the grit reduced milk of lime of step (b) and/or one or more of the grit fractions of step (b) and/or the fine grit of step (c), the precipitated calcium carbonate obtainable according to the process of the present invention may comprise at least one additive selected from monosaccharides, disaccharides, polyacrylic acids in their neutralized or partly neutralized forms, citric acid, or sodium citrate in a total amount of from 0.005 to 1.0 wt.-%, preferably from 0.01 to 0.5 wt.-%, and more preferably from 0.02 to 0.2 wt.-%, based on the total dry weights.

Preferably, said at least one additive is selected from sucrose, citric acid, or sodium citrate and more preferably is sucrose.

The skilled person will appreciate that it is possible to use further additives at any stage of the inventive process. In this respect, it is possible to use brightening agents, such as sodium dithionite, during milling step (c) in order to further increase the brightness (R457) of the final product.

Additionally or alternatively, it also possible to subject the precipitated calcium carbonate of the inventive process to further steps, e.g., to a surface treatment or a surface modification step. It is even possible to use the precipitated calcium carbonate of the inventive process as a seed material in further carbonation reactions.

Depending on the use of the precipitated calcium carbonate, the product obtainable according to the present invention may further be dried by any known method.

It is also possible to mix the precipitated calcium carbonate of the present invention, either in wet or dry state, with further filler materials (e.g., mineral filler materials).

According to a further aspect, the inventive precipitated calcium carbonate may be used in polymer compositions, paper making, paper products, paper coatings, agricultural applications, paints, adhesives, sealants, construction applications, food applications, pharmaceutical applications or cosmetic applications. For this purpose, the inventive precipitated calcium carbonate may be used either directly or after subjecting same to one or more of the aforementioned or any other known additional steps.

Due to its good optical properties and fine particle size distribution, the inventive precipitated calcium carbonate may advantageously be used as a filler material in paper or in paper coatings.

EXAMPLES

The scope and interest of the invention may be better understood on basis of the following examples which are intended to illustrate embodiments of the present invention. However, they are not to be construed to limit the scope of the claims in any manner whatsoever.

Example 1

Grit Separation

In a first trial, calcium oxide was slaked with 5 parts per weight of water at 230 rpm for 25 min during which the temperature was kept at 40° C. The obtained milk of lime was screened through a screen having an aperture size of 200 µm to obtain grit reduced milk of lime and a grit fraction.

In a second trial, 200 kg of calcium oxide were slaked with 1,700 kg of water at 40° C. The obtained milk of lime was screened through a screen having an aperture size of 200 µm to obtain grit reduced milk of lime and a grit fraction.

Example 2

Milling Trials, Production of Fine Grit

A grit fraction ($d_{50}=1.1$ mm) obtained from screening milk of lime through a screen having an aperture size of 200 µm was used in the following milling trials to produce fine grit. For this purpose, the grit fraction was charged into an octagonal sand mill (volume: 1.8 m$^3$; number of baffles: 4; beads: 1,200 kg of Bitossi Microbits 1.5 to 2.5 mm). Milling was then carried out in a continuous process to produce fine grit using a 0.4 mm grid as the outlet of the mill which was installed at 34% of the overall vertical height of 1,400 mm and equipped with a pump. A dual net sieve having aperture sizes of 100 and 45 µm, respectively, was installed downstream of said pump. Varying amounts of sucrose, based on the dry weight of the milk of lime, were added in Trials 2 to 5 and 7 in order to reduce the viscosity of the grinding stocks. The milling trials are listed in Table 1 below.

TABLE 1

Results of grit milling (n/d = not determined), dt refers to dry tonnes.

|  |  | Trial | | | | | |
|---|---|---|---|---|---|---|---|
|  |  | 1 | 2 | 3 | 4 | 5 | 7 |
| Mill inlet | Flow rate [dt/h] | 0.50 | 0.53 | 0.66 | 0.79 | 0.79 | 1.35 |
|  | Sucrose [kg/h] | 0.00 | 3.00 | 3.30 | 4.00 | 11.9 | 3.8 |
|  | Solids content [wt.-%] | 25.3 | 39.4 | 42.6 | 46.8 | 53.8 | 45.3 |
| Mill outlet | $d_{50}$ [µm] | 2.1 | 1.5 | 1.7 | 1.9 | n/d | 1.46 |
|  | $d_{98}$ [µm] | 20 | 17 | 16 | 19 | n/d | 11.5 |
|  | pH | 12.7 | 12.7 | 12.7 | 12.6 | n/d | 12.6 |
|  | Viscosity [mPa · s] | 85 | 600 | 639 | 875 | 2388 | 448 |
|  | Brightness (R457) [%] | 79.3 | 80.1 | 79.7 | 79.5 | n/d | 82.9 |
|  | Grinding energy [kWh/t] | 241 | 205 | 160 | 133 | n/d | 122 |

In Trial 5, the pump at the vertical outlet was not able to pump the slurry due to the high viscosity. However, the sand mill was still able to perform properly at this high solids content and no blocking of the 0.4 mm grid was observed.

Example 3

Carbonation of Fine Grit

Fine grit having a $d_{50}$ of 1.9 µm, a $d_{98}$ of 19 µm and a brightness (R457) of 79.5% obtained from grit milling (Example 2, Trial 4) was charged into a glass beaker and adjusted to approx. 15 wt.-% solids content and 100% carbon dioxide was introduced until a pH of below 7 was reached. The obtained product showed a $d_{98}$ of 10 µm and the brightness (R457) was 82.8% as compared to 79.5% of the starting material.

Example 4

Combined Carbonation of Fine Grit and Grit Reduced Milk of Lime Using Different Amounts of Fine Grit As a reference sample (Trial 1), 200 kg of calcium oxide were slaked with 1,700 kg of water at 40° C. The obtained milk of lime was screened through a screen having an aperture size of 200 µm. The obtained grit reduced milk of lime was heated to 50° C. and 0.04 wt.-% of sucrose, based on the dry weight of the milk of lime, were added. Carbonation was then conducted by injecting 20% carbon dioxide at 200 Nm$^3$/h and 240 rpm until 5 min after conductivity minimum.

Further carbonation trials were carried out under identical conditions, wherein different amounts of fine grit having a $d_{50}$ of 1.9 µm, a $d_{98}$ of 19 µm and a brightness (R457) of 79.5% obtained from grit milling (Example 2, Trial 4) and also different amounts of sucrose, both based on the dry weight of the milk of lime, were added prior to carbonation (Trials 2 to 5). The carbonation product was screened at 45 µm aperture size prior to determination of the brightness (R457) and particle size distribution of the screened product as well as the percentage of retained material (see Table 2). The retained oversize material was subjected to XRD analysis using a Bruker AXS D8 Advanced XRD system (5 to 100° 2theta Bragg diffraction; Cu K-α radiation; automated divergence slits; linear position-sensitive detector; tube current and voltage: 50 mA, 35 kV; step size: 0.02° 2theta; counting time: 0.5 s per step; for results see Table 3).

TABLE 2

Results of combined carbonation.

|  | Trial | | | | |
|---|---|---|---|---|---|
|  | 1 | 2 | 3 | 4 | 5 |
| Sucrose [wt.-%] | 0.04 | 0.06 | 0.06 | 0.06 | 0.00 |
| Fine grit [wt.-%] | 0.00 | 1.35 | 4.05 | 8.10 | 8.10 |
| Brightness (R457) [%] | 94.7 | 94.4 | 94.2 | 93.6 | 93.4 |
| Residues >45 µm [wt.-%] | 0.38 | 0.30 | 0.30 | 0.28 | 0.26 |
| $d_{50}$ [µm] | 2.8 | 2.2 | 2.0 | 1.6 | 1.7 |
| $d_{98}$ [µm] | 5.3 | 4.5 | 4.0 | 4.0 | 4.1 |

TABLE 3

XRD analysis of 45 µm screen residues.

| [wt.-%] | Trial | | | | |
|---|---|---|---|---|---|
|  | 1 | 2 | 3 | 4 | 5 |
| Aragonite | 1.83 | 1.95 | 0.00 | 0.00 | 0.88 |
| Calcite | 93.00 | 92.44 | 94.19 | 93.25 | 90.97 |
| Cristobalite | 0.21 | 0.23 | 0.26 | 0.41 | 0.39 |

TABLE 3-continued

XRD analysis of 45 μm screen residues.

| [wt.-%] | Trial | | | | |
|---|---|---|---|---|---|
| | 1 | 2 | 3 | 4 | 5 |
| Dolomite | 0.00 | 0.50 | 0.07 | 0.32 | 0.07 |
| Gehlenite | 0.88 | 1.53 | 2.27 | 1.80 | 2.55 |
| Larnite | 1.68 | 1.54 | 1.10 | 1.62 | 1.40 |
| Plagioclase | 0.12 | 0.00 | 0.00 | 0.00 | 0.00 |
| Quartz | 2.28 | 0.00 | 2.19 | 2.60 | 3.74 |
| White mica | 0.00 | 0.18 | 0.00 | 0.00 | 0.00 |

Example 5

Combined Carbonation of Fine Grit and Grit Reduced Milk of Lime with Time Dependent Addition of Fine Grit As a reference sample (Trial 1), calcium oxide was slaked with 5 parts per weight of water at 230 rpm for 25 min during which the temperature was kept at 40° C. The obtained milk of lime was screened through a screen having an aperture size of 200 μm. The obtained grit reduced milk of lime was heated to 50° C. and 0.08 wt.-% of sucrose, based on the dry weight of the milk of lime, were added. Carbonation was then conducted by injecting 20% carbon dioxide at 15 l/min and 750 rpm until 5 min after conductivity minimum.

Further carbonation trials were carried out under identical conditions, wherein fine grit having a $d_{50}$ of 1.9 μm and a brightness (R457) of 81.0% was added at different times corresponding to a conversion of calcium hydroxide as set out below in Table 4 (Trials 2 to 6).

All carbonation products were screened at 45 μm aperture size prior to their characterization.

TABLE 4

Results of time dependent grit addition (n/a = not applicable).

| | Trial | | | | | |
|---|---|---|---|---|---|---|
| | 1 | 2 | 3 | 4 | 5 | 6 |
| Sucrose [wt.-%] | 0.08 | 0.06 | 0.06 | 0.06 | 0.06 | 0.04 |
| Fine grit [wt.-%] | 0.00 | 4.00 | 4.00 | 4.00 | 4.00 | 8.00 |
| Conversion at grit addition [%] | n/a | 27 | 41 | 66 | 95 | 68 |
| Brightness (R457) [%] | 94.7 | 93.7 | 94.3 | 95.1 | 93.0 | 94.2 |
| $d_{50}$ [μm] | 2.2 | 2.2 | 2.5 | 2.3 | 2.4 | 2.3 |
| Specific surface area [m²/g] | 7.8 | 6.6 | 6.9 | 6.8 | 6.1 | 6.7 |

All grit addition Trials 2 to 6 yielded good brightness values (R457) of 93.0% or higher. In Trial 4, the brightness was even higher than in comparative Trial 1.

Example 6

Combined Carbonation and Grit Addition in Industrial Scale

Calcium oxide (CaO) was slaked in the presence of water at 40° C. and with a total citric acid dosing ratio of 0.107 wt.-%, based on the CaO, to obtain 30 m³ milk of lime having a density of 1086 kg/m³ and a solids content of 16.5 wt.-%. The obtained milk of lime was screened through a screen having an aperture size of 200 μm.

27 m³ of the obtained grit reduced milk of lime was introduced a 45 m³ stainless steel PCC reactor. The starting temperature of the milk of lime was 44° C. This milk of lime was used for the reference sample (Trial 8) as well as for the inventive sample (Trial 9).

Reference Sample (Trial 8)

Carbonation was then conducted by injecting 20 Vol.-% carbon dioxide at 4770 Nm³/h and stirring until 5 min after conductivity minimum.

Inventive Sample (Trial 9)

This carbonation trial was carried out under identical conditions, with the following exceptions:

The carbonation was conducted for the first 100 minutes. Then a slurry of fine grit having the following properties: a $d_{50}$ of 1.46 μm, a $d_{98}$ of 11.5 μm, a brightness (R457) of 82.9% (Example 2, Trial 7), a grit solids content of 44 wt.-%, based on the dry weight of the grit, a grit slurry sucrose content of 0.14 wt.-%, based on the dry weight of the milk of lime, a grit slurry sucrose content of 0.31 wt.-%, based on the dry weight of the grit, and a grit slurry density of 1378 kg/m³, was added to the reaction mixture in the PCC reactor. This corresponds to about 60% of the carbonation time.

The carbonation was continued until 5 min after conductivity minimum.

The properties of the products obtained from Trials 8 and 9 can be derived from the following Table 5.

TABLE 5

The properties of the products obtained from industrial scale trials.

| | Trial | |
|---|---|---|
| | 8 | 9 |
| Solids content [wt.-%] | 21.3 | 21.1 |
| $d_{50}$ [μm] | 2.36 | 2.47 |
| pH | 7.8 | 7.7 |
| Brightness (R457) [%] | 94.9 | 93.8 |

Example 7

Use of Precipitated Calcium Carbonate in Handsheets

Calcium oxide was slaked with 5 parts per weight of water at 230 rpm for 25 min during which the temperature was kept at 40° C. One part per weight of the obtained milk of lime was mixed with one part per weight of the PCC obtained according to Trial 6 of Example 5 (8.00 wt.-% grit added at 68% conversion) prior to carbonation which was subsequently conducted by injecting 20% carbon dioxide at 15 l/min and 750 rpm until 5 min after conductivity minimum.

For the handsheet study, eucalyptus pulp (FPI TSI-Lab FP standard fibres) refined to 30° SR was used. In Trial 1 of the present study, an aqueous suspension was prepared by diluting 80 g (dry) pulp and 17 g PCC as described above to a total volume of 10 dm³. The obtained suspension was stirred for 30 min. Subsequently, 450 ml of the obtained suspension were mixed with 0.06 wt.-% (based on dry weight) of polyacrylamide (Polymin 1530, commercially available from BASF, Ludwigshafen, Germany) as retention aid. Then, handsheets of 75 g/m² were formed using a Rapid-Kothen hand sheet former. Each handsheet was pressed for 1 min at 0.42 MPa in a wet press using a chromo board and two conditioned felts (pre-treatment with tap water for 2 to 3 min). The sheets were dried for 6 min at 105° C. The filler content of the handsheets was controlled and adjusted, if necessary.

Further handsheets were produced under identical conditions by use of the PCC of Trials 2 and 4 of Example 5 as well as of commercial PCC (Omya Syncarb® 270), see Trials B-D in Table 6 below.

TABLE 6

Handsheet studies.

| | Trial | | | |
|---|---|---|---|---|
| | A | B | C | D |
| Filler type | Example 5 Trial 6 + Milk of lime (1:1) | Example 5 Trial 2 | Example 5 Trial 4 | Omya Syncarb ® 270 |
| Filler content [wt.-%] | 19.4 | 19.4 | 19.5 | 19.3 |
| Bulk [cm³/g] | 1.75 | 1.73 | 1.74 | 1.69 |
| Opacity [%] | 90.4 | 90.8 | 90.7 | 90.1 |

The obtained handsheets show an increased bulk density as well as an increased opacity at equal filler contents.

The filler content of handsheets was determined after constant weight was reached upon rapid incineration of a quarter handsheet sample at 570° C. in a muffle furnace. After burning was completed, the residue was transferred in a desiccator and allowed to cool down. After room temperature was reached, the weight of the residue was measured and the mass was correlated with the initial weight of the quarter hand sheet. To determine the grammage, handsheets were kept at 23° C. and 50% relative humidity for 24 hours. Opacity was determined according to DIN 53146.

The invention claimed is:

1. A process for the preparation of precipitated calcium carbonate, the process comprising the steps of:
   (a) providing milk of lime;
   (b) separating grit from the milk of lime provided in step (a), the grit corresponding to an oversize fraction retained by a screen having an aperture size of 400 μm or finer, to obtain:
      (i) grit reduced milk of lime, and
      (ii) a grit fraction;
   (c) milling the grit fraction of step (b) in at least one milling unit to obtain fine grit; and
   (d) subjecting to a carbonation step either:
      (i) the fine grit of step (c), or
      (ii) a mixture comprising the grit reduced milk of lime of step (b) and the fine grit of step (c);
   wherein said carbonation step comprises the introduction of carbon dioxide to obtain precipitated calcium carbonate.

2. The process according to claim 1, wherein the milk of lime provided in step (a) has a solids content of from 1.0 to 40.0 wt.-%, based on the total weight of said milk of lime.

3. The process according to claim 1, wherein the milk of lime provided in step (a) has a solids content of from 5.0 to 35.0 wt.-%, based on the total weight of said milk of lime.

4. The process according to claim 1, wherein step (b) comprises a screening step by use of a screen having an aperture size of 400 μm to 150 μm.

5. The process according to claim 1, wherein step (b) comprises a screening step by use of a screen having an aperture size of 350 to 180 μm.

6. The process according to claim 1, wherein step (b) comprises a screening step by use of a screen having an aperture size of 250 to 200 μm.

7. The process according to claim 1, wherein the at least one milling unit of step (c) comprises a sand mill, a roller mill, a ball mill, or a hammer mill.

8. The process according to claim 1, wherein the at least one milling unit of step (c) comprises a sand mill.

9. The process according to claim 1, wherein the solids content of the grit fractions during milling is in the range of from 20.0 to 80.0 wt. -%, based on the total weight the grit fractions.

10. The process according to claim 1, wherein the solids content of the grit fractions during milling is in the range of from 25.0 to 50.0 wt.-%, based on the total weight the grit fractions.

11. The process according to claim 1, wherein step (c) further comprises a step of screening the grit fraction subsequently to the milling of the fraction, by use of a screen and removing the oversize fraction retained by the screen.

12. The process according to claim 11, wherein the screen has an aperture size of 300 μm or finer.

13. The process according to claim 11, wherein the screen has an aperture size of 300 μm to 45 μm.

14. The process according to claim 11, wherein the screen has an aperture size of 250 μm to 50 μm.

15. The process according to claim 1, wherein the fine grit of step (c) has a $d_{50}$ ranging from 0.1 to 10.0 μm.

16. The process according to claim 1, wherein the fine grit of step (c) has a $d_{50}$ ranging from 0.2 to 5.0 μm.

17. The process according to claim 1, wherein the fine grit of step (c) has a $d_{50}$ ranging from 0.3 to 3.0 μm.

18. The process according to claim 1, wherein the fine grit of step (c) has a $d_{98}$ ranging from 2.0 to 20.0 μm.

19. The process according to claim 1, wherein the fine grit of step (c) has a $d_{98}$ ranging from 6.0 to 12.0 μm.

20. The process according to claim 1, wherein the starting temperature in step (d) ranges from 5 to 80° C.

21. The process according to claim 1, wherein the process further comprises a step of adding at least one additive selected from monosaccharides, disaccharides, polyacrylic acids in their neutralized or partly neutralized forms, citric acid, or sodium citrate to the milk of lime provided in step (a) and/ or the grit reduced milk of lime of step (b) and/or the grit fraction of step (b) and/or the fine grit of step (c) in a total amount of from 0.005 to 1.0 wt.-%, based on the total dry weights.

22. The process according to claim 1, wherein the process further comprises a step of adding at least one additive selected from monosaccharides, disaccharides, polyacrylic acids in their neutralized or partly neutralized forms, citric acid, or sodium citrate to the milk of lime provided in step (a) and/or the grit reduced milk of lime of step (b) and/or the grit fraction of step (b) and/or the fine grit of step (c) in a total amount of from 0.01 to 0.5 wt.-%, based on the total dry weights.

23. The process according to claim 1, wherein step (d) consists of subjecting to a carbonation step the fine grit of step (c).

24. The process according to claim 1, wherein step (d) consists of subjecting to a carbonation step the mixture comprising the grit reduced milk of lime of step (b) and the fine grit of step (c), and wherein the fine grit is added to the grit reduced milk of lime in one or more portions.

25. The process according to claim 24, wherein the total amount of fine grit added to the grit reduced milk of lime ranges from 0.1 to 15.0 wt.-%, based on the total dry weights.

26. The process according to claim 24, wherein the total amount of fine grit added to the grit reduced milk of lime ranges from 0.2 to 10.0 wt.-%, based on the total dry weights.

27. The process according to claim 24, wherein the total amount of fine grit added to the grit reduced milk of lime ranges from 0.5 to 5.0 wt.-%, based on the total dry weights.

28. The process according to claim 24, wherein the fine grit is added to the grit reduced milk of lime at a time corresponding to from 0 to 100%, conversion of calcium hydroxide into precipitated calcium carbonate.

29. The process according to claim 24, wherein the fine grit is added to the grit reduced milk of lime at a time corresponding to from 35% to 95%, conversion of calcium hydroxide into precipitated calcium carbonate.

30. The process according to claim 24, wherein the fine grit is added to the grit reduced milk of lime at a time corresponding to from 60% to 80%, conversion of calcium hydroxide into precipitated calcium carbonate.

* * * * *